US011062163B2

(12) United States Patent
Thrasher et al.

(10) Patent No.: US 11,062,163 B2
(45) Date of Patent: Jul. 13, 2021

(54) ITERATIVE RECOGNITION-GUIDED THRESHOLDING AND DATA EXTRACTION

(71) Applicant: Kofax, Inc., Irvine, CA (US)

(72) Inventors: Christopher W. Thrasher, Rochester, NY (US); Alexander Shustorovich, Pittsford, NY (US); Stephen Michael Thompson, Oceanside, CA (US); Jan W. Amtrup, Silver Spring, MD (US); Anthony Macciola, Irvine, CA (US)

(73) Assignee: KOFAX, INC., Irvine, CA (US)

( * ) Notice: Subject to any disclaimer, the term of this patent is extended or adjusted under 35 U.S.C. 154(b) by 0 days.

(21) Appl. No.: 16/267,205

(22) Filed: Feb. 4, 2019

(65) Prior Publication Data
US 2019/0171900 A1 Jun. 6, 2019

Related U.S. Application Data

(63) Continuation of application No. 15/214,351, filed on Jul. 19, 2016, now Pat. No. 10,242,285.
(Continued)

(51) Int. Cl.
*G06K 9/34* (2006.01)
*G06T 7/11* (2017.01)
(Continued)

(52) U.S. Cl.
CPC ............. *G06K 9/34* (2013.01); *G06K 9/3233* (2013.01); *G06K 9/38* (2013.01); *G06K 9/4638* (2013.01);
(Continued)

(58) Field of Classification Search
CPC . G06T 7/11; G06T 7/136; G06T 2207/20212; G06T 7/62; G06T 7/187;
(Continued)

(56) References Cited

U.S. PATENT DOCUMENTS 5,764,813 A * 6/1998 Murayama ............... G06K 9/38
358/465
6,278,798 B1 8/2001 Rao
(Continued)

FOREIGN PATENT DOCUMENTS

EP 1146478 A2 10/2001
EP 2388735 A2 11/2011

OTHER PUBLICATIONS

Non-Final Office Action from U.S. Appl. No. 15/051,587, dated Jul. 31, 2019.
(Continued)

*Primary Examiner* — Jingge Wu
(74) *Attorney, Agent, or Firm* — Zilka-Kotab, P.C.

(57) ABSTRACT

Techniques for binarization and extraction of information from image data are disclosed. The inventive concepts include independently binarizing portions of the image data on the basis of individual features, e.g. per connected component, and using multiple different binarization thresholds to obtain the best possible binarization result for each portion of the image data. Determining the quality of each binarization result may be based on attempted recognition and/or extraction of information therefrom. Independently binarized portions may be assembled into a contiguous result. In one embodiment, a method includes: identifying a region of interest within a digital image; generating a plurality of binarized images based on the region of interest using different binarization thresholds; subjecting the region of interest within a digital image to a plurality of thresholding and extraction iterations; and extracting data from some or all of the plurality of binarized images. Corresponding systems and computer program products are disclosed.

16 Claims, 8 Drawing Sheets

Related U.S. Application Data

(60) Provisional application No. 62/194,783, filed on Jul. 20, 2015.

(51) Int. Cl.
    *G06T 7/136*     (2017.01)
    *G06T 7/187*     (2017.01)
    *G06K 9/32*     (2006.01)
    *G06K 9/46*     (2006.01)
    *G06K 9/38*     (2006.01)

(52) U.S. Cl.
    CPC ............... *G06T 7/11* (2017.01); *G06T 7/136* (2017.01); *G06T 7/187* (2017.01); *G06T 2207/20104* (2013.01)

(58) Field of Classification Search
    CPC . G06T 7/73; G06T 2207/30232; G06T 7/194; G06T 11/206; G06T 2207/30176; G06K 9/38; G06K 9/00147; G06K 9/4638; G06K 9/00442; G06K 9/34; G06K 9/3258; G06K 9/3233; G06K 9/6267
    See application file for complete search history.

(56) References Cited

U.S. PATENT DOCUMENTS

| | | | |
|---|---|---|---|
| 6,281,928 B1 | 8/2001 | Umezaki et al. | |
| 6,339,426 B1 | 1/2002 | Lui et al. | |
| 6,529,202 B2 | 3/2003 | Wu | |
| 6,647,139 B1 | 11/2003 | Kunii et al. | |
| 6,778,297 B1 | 8/2004 | Fujiwara | |
| 7,031,496 B2 | 4/2006 | Shimano et al. | |
| 7,088,460 B2 | 8/2006 | Toyama et al. | |
| 7,160,253 B2 | 1/2007 | Nissila | |
| 7,403,310 B2 | 7/2008 | Miyagi et al. | |
| 7,418,131 B2 | 8/2008 | Wang et al. | |
| 7,539,344 B2 | 5/2009 | Eguchi et al. | |
| 7,606,439 B2 | 10/2009 | Lefebure et al. | |
| 7,695,143 B2 | 4/2010 | Kobayashi | |
| 7,720,283 B2 | 5/2010 | Sun et al. | |
| 7,746,356 B2 | 6/2010 | Meinders | |
| 7,809,587 B2 | 10/2010 | Dorai et al. | |
| 8,019,629 B1 | 9/2011 | Medina, III et al. | |
| 8,068,674 B2 | 11/2011 | Goncalves | |
| 8,155,425 B1 | 4/2012 | Mandel | |
| 8,228,323 B2 | 7/2012 | Bandel et al. | |
| 8,233,033 B2 | 7/2012 | Aarts et al. | |
| 8,285,034 B2 | 10/2012 | Rajaraman et al. | |
| 8,620,078 B1 * | 12/2013 | Chapleau ............ | G06K 9/344 382/173 |
| 8,688,579 B1 | 4/2014 | Ethington et al. | |
| 8,718,405 B2 | 5/2014 | Fujiki et al. | |
| 8,755,779 B1 | 6/2014 | Burks et al. | |
| 8,879,839 B2 | 11/2014 | Ishida et al. | |
| 8,977,075 B2 | 3/2015 | Tytgat | |
| 9,053,515 B1 | 6/2015 | Nowak et al. | |
| 9,367,899 B1 * | 6/2016 | Fang .................. | G06T 7/11 |
| 9,430,766 B1 * | 8/2016 | Kraft .................. | G06Q 20/352 |
| 9,674,505 B2 | 6/2017 | Wu et al. | |
| 9,779,926 B2 | 10/2017 | Van Berkel et al. | |
| 9,817,081 B2 | 11/2017 | Hahn et al. | |
| 9,965,871 B1 * | 5/2018 | Li ..................... | G06K 9/6282 |
| 9,979,296 B2 | 5/2018 | Djenguerian et al. | |
| 10,049,291 B2 | 8/2018 | Nishikawa et al. | |
| 10,140,511 B2 | 11/2018 | Macciola et al. | |
| 10,146,795 B2 | 12/2018 | Macciola et al. | |
| 10,146,803 B2 | 12/2018 | Kilby et al. | |
| 10,157,331 B1 | 12/2018 | Tang et al. | |
| 10,354,159 B2 | 7/2019 | Savvides et al. | |
| 10,467,465 B2 | 11/2019 | Shustorovich et al. | |
| 10,515,407 B2 | 12/2019 | Amtrup et al. | |
| 10,635,712 B2 | 4/2020 | Macciola et al. | |
| 10,657,600 B2 | 5/2020 | Macciola et al. | |
| 10,664,919 B2 | 5/2020 | Macciola et al. | |
| 10,699,146 B2 | 6/2020 | Shustorovich | |
| 10,783,613 B2 | 9/2020 | Ma et al. | |
| 10,783,615 B2 | 9/2020 | Ma et al. | |
| 10,803,350 B2 | 10/2020 | Ma et al. | |
| 2001/0043273 A1 | 11/2001 | Herrod et al. | |
| 2002/0035488 A1 | 3/2002 | Aquila et al. | |
| 2002/0057838 A1 | 5/2002 | Steger | |
| 2002/0150241 A1 | 10/2002 | Scheidt et al. | |
| 2002/0188479 A1 | 12/2002 | Renwick et al. | |
| 2003/0108238 A1 | 6/2003 | Xu | |
| 2003/0138135 A1 | 7/2003 | Chung et al. | |
| 2003/0179294 A1 | 9/2003 | Martins | |
| 2004/0071311 A1 | 4/2004 | Choi et al. | |
| 2004/0114799 A1 * | 6/2004 | Xu ..................... | G06K 9/00711 382/173 |
| 2004/0125877 A1 | 7/2004 | Chang et al. | |
| 2004/0202349 A1 * | 10/2004 | Erol ................... | G06F 16/5838 382/100 |
| 2004/0250205 A1 | 12/2004 | Conning | |
| 2005/0100210 A1 | 5/2005 | Rice et al. | |
| 2005/0175243 A1 * | 8/2005 | Luo .................... | G06K 9/6292 382/224 |
| 2005/0207622 A1 | 9/2005 | Haupt et al. | |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2006/0020630 A1 | 1/2006 | Stager et al. | |
| 2006/0029276 A1 | 2/2006 | Nagahashi et al. | |
| 2006/0045379 A1 | 3/2006 | Heaney et al. | |
| 2006/0061802 A1 | 3/2006 | Ogura | |
| 2006/0093998 A1 | 5/2006 | Vertegaal | |
| 2006/0210164 A1 * | 9/2006 | Hideyuki ............ | G06K 9/38 382/190 |
| 2007/0058856 A1 * | 3/2007 | Boregowda ......... | G06K 9/3258 382/159 |
| 2007/0094296 A1 | 4/2007 | Peters | |
| 2007/0110417 A1 * | 5/2007 | Itokawa ............. | H04N 5/23277 396/52 |
| 2007/0237425 A1 | 10/2007 | Taguchi et al. | |
| 2007/0260492 A1 | 11/2007 | Feied et al. | |
| 2008/0013836 A1 | 1/2008 | Nakamura et al. | |
| 2008/0031514 A1 | 2/2008 | Kakinami | |
| 2008/0052134 A1 | 2/2008 | Nowak et al. | |
| 2008/0192991 A1 | 8/2008 | Gremse et al. | |
| 2009/0041330 A1 | 2/2009 | Journey et al. | |
| 2009/0043782 A1 | 2/2009 | Otake et al. | |
| 2009/0080738 A1 | 3/2009 | Zur et al. | |
| 2009/0141940 A1 | 6/2009 | Zhao et al. | |
| 2009/0185738 A1 | 7/2009 | Nepomniachtchi | |
| 2009/0263025 A1 | 10/2009 | Li | |
| 2009/0265193 A1 | 10/2009 | Collins et al. | |
| 2010/0038839 A1 | 2/2010 | DeWitt et al. | |
| 2010/0142820 A1 * | 6/2010 | Malik ................. | G06K 9/38 382/176 |
| 2010/0174564 A1 | 7/2010 | Stender et al. | |
| 2010/0189367 A1 | 7/2010 | van der Merwe et al. | |
| 2010/0289797 A1 | 11/2010 | Tateno et al. | |
| 2011/0116684 A1 | 5/2011 | Coffman et al. | |
| 2011/0123120 A1 | 5/2011 | Quack | |
| 2011/0128360 A1 | 6/2011 | Hatzav et al. | |
| 2011/0142341 A1 | 6/2011 | Dolan et al. | |
| 2011/0178708 A1 | 7/2011 | Zhang et al. | |
| 2011/0179289 A1 | 7/2011 | Guenther | |
| 2011/0254942 A1 | 10/2011 | Suzuki | |
| 2011/0312374 A1 | 12/2011 | Chen et al. | |
| 2012/0002057 A1 | 1/2012 | Kakinami | |
| 2012/0051628 A1 | 3/2012 | Noguchi et al. | |
| 2012/0070088 A1 | 3/2012 | Yoshimi | |
| 2012/0076420 A1 | 3/2012 | Kono et al. | |
| 2012/0084277 A1 | 4/2012 | Barve et al. | |
| 2012/0087552 A1 | 4/2012 | Lee | |
| 2012/0134576 A1 * | 5/2012 | Sharma ............... | G06K 9/4604 382/155 |
| 2012/0170829 A1 | 7/2012 | Jackson et al. | |
| 2012/0269398 A1 * | 10/2012 | Fan .................... | G06K 9/3258 382/105 |
| 2012/0274991 A1 * | 11/2012 | Roy ................... | H04N 1/387 358/462 |

(56) References Cited

U.S. PATENT DOCUMENTS

| | | |
|---|---|---|
| 2013/0044186 A1 | 2/2013 | Jin et al. |
| 2013/0051671 A1 | 2/2013 | Barton |
| 2013/0063788 A1 | 3/2013 | Iwayama et al. |
| 2013/0120595 A1 | 5/2013 | Roach et al. |
| 2013/0155058 A1 | 6/2013 | Golparvar-Fard et al. |
| 2013/0215480 A1 | 8/2013 | Iwayama et al. |
| 2013/0216094 A1 | 8/2013 | DeLean |
| 2013/0223721 A1 | 8/2013 | Nepomniachtchi et al. |
| 2013/0272607 A1 | 10/2013 | Chattopadhyay et al. |
| 2013/0294652 A1* | 11/2013 | Fan ............... G06K 9/3258 382/105 |
| 2014/0003717 A1 | 1/2014 | Brito et al. |
| 2014/0020005 A1 | 1/2014 | Amselem et al. |
| 2014/0050367 A1 | 2/2014 | Chen et al. |
| 2014/0072201 A1 | 3/2014 | Tilt |
| 2014/0072219 A1 | 3/2014 | Tian |
| 2014/0093177 A1 | 4/2014 | Hayashi et al. |
| 2014/0237429 A1 | 8/2014 | Abrahami et al. |
| 2014/0270349 A1* | 9/2014 | Amtrup ........... G06K 9/00469 382/103 |
| 2014/0324648 A1 | 10/2014 | Mori et al. |
| 2015/0030227 A1 | 1/2015 | Liang et al. |
| 2015/0093033 A1* | 4/2015 | Kwon ............. G06K 9/00442 382/195 |
| 2015/0146989 A1 | 5/2015 | Shiiyama et al. |
| 2015/0281949 A1 | 10/2015 | LaBorde |
| 2016/0028921 A1* | 1/2016 | Thrasher ........... H04N 1/4092 358/519 |
| 2016/0210507 A1* | 7/2016 | Abdollahian ......... G06T 3/60 |
| 2016/0227181 A1 | 8/2016 | Ilic et al. |
| 2017/0147900 A1 | 5/2017 | Booth |
| 2017/0300786 A1 | 10/2017 | Gope et al. |
| 2019/0034456 A1 | 1/2019 | Macciola et al. |
| 2019/0034734 A1 | 1/2019 | Yen et al. |
| 2019/0035061 A1 | 1/2019 | Ma et al. |
| 2019/0087942 A1 | 3/2019 | Ma et al. |
| 2019/0130583 A1 | 5/2019 | Chen et al. |
| 2019/0164010 A1 | 5/2019 | Ma et al. |
| 2019/0164313 A1 | 5/2019 | Ma et al. |
| 2019/0347485 A1 | 11/2019 | Yang et al. |
| 2020/0005035 A1 | 1/2020 | Shustorovich et al. |
| 2020/0219202 A1 | 7/2020 | Macciola et al. |
| 2020/0380643 A1 | 12/2020 | Ma et al. |
| 2020/0394452 A1 | 12/2020 | Ma et al. |
| 2020/0394453 A1 | 12/2020 | Ma et al. |
| 2020/0394763 A1 | 12/2020 | Ma et al. |
| 2021/0027431 A1 | 1/2021 | Ma et al. |

OTHER PUBLICATIONS

Corrected Notice of Allowance from U.S. Appl. No. 15/396,327, dated Aug. 28, 2019.
Examination Report from European Application No. 14 792 188.6, dated Aug. 20, 2019.
Non-Final Office Action from U.S. Appl. No. 15/394,731, dated Sep. 5, 2019.
Final Office Action from U.S. Appl. No. 16/052,495, dated Sep. 11, 2019.
Ma et al., U.S. Appl. No. 16/194,201, filed Nov. 16, 2018.
Extended European Search Report from European Application No. 16828499.0, dated Jan. 2, 2019.
Non-Final Office Action from U.S. Appl. No. 15/396,327, dated Mar. 8, 2019.
Non-Final Office Action from U.S. Appl. No. 16/052,495, dated Mar. 18, 2019.
Ma et al., U.S. Appl. No. 16/206,912, filed Nov. 30, 2018.
Ma et al., U.S. Appl. No. 16/206,926, filed Nov. 30, 2018.
Non-Final Office Action from U.S. Appl. No. 15/394,726, dated Mar. 28, 2019.
Non-Final Office Action from U.S. Appl. No. 15/339,789, dated Apr. 15, 2019.
Non-Final Office Action from U.S. Appl. No. 15/396,306, dated Apr. 18, 2019.
Restriction Requirement from U.S. Appl. No. 15/672,200, dated Mar. 29, 2019.
Final Office Action from U.S. Appl. No. 15/396,306, dated Sep. 17, 2019.
Notice of Allowance from U.S. Appl. No. 15/396,327, dated Sep. 24, 2019.
Non-Final Office Action from U.S. Appl. No. 15/394,739, dated Jun. 17, 2019.
Notice of Allowance from U.S. Appl. No. 15/396,327, dated Jun. 21, 2019.
Examination Report from European Application No. 14 847 922.3, dated Apr. 24, 2019.
Non-Final Office Action from U.S. Appl. No. 15/672,200, dated Jun. 26, 2019.
Final Office Action from U.S. Appl. No. 15/394,726, dated Oct. 11, 2019.
Final Office Action from U.S. Appl. No. 15/339,789, dated Oct. 28, 2019.
Notice of Allowance from U.S. Appl. No. 15/394,739, dated Oct. 31, 2019.
Final Office Action from U.S. Appl. No. 15/672,200, dated Oct. 24, 2019.
Restriction Requirement from U.S. Appl. No. 16/151,090, dated Nov. 25, 2019.
Notice of Allowance from U.S. Appl. No. 16/052,495, dated Dec. 18, 2019.
Notice of Allowance from U.S. Appl. No. 15/394,726, dated Jan. 8, 2020.
Notice of Allowance from U.S. Appl. No. 15/339,789, dated Jan. 16, 2020.
Final Office Action from U.S. Appl. No. 15/051,587, dated Jan. 27, 2020.
Non-Final Office Action from U.S. Appl. No. 16/194,201, dated Feb. 3, 2020.
Pinto et al., "Why is real-World Visual Object Recognition Hard?" PLoS Computational Biology, Jan. 2008, vol. 4, No. 1, pp. 0151-0156.
Lowe, D., "Object Recognition from Local Scale-Invariant Features," Proceedings of the International Conference on Computer Vision, Sep. 1999, pp. 1-8.
Final Office Action from U.S. Appl. No. 15/394,731, dated Feb. 12, 2020.
Non-Final Office Action from U.S. Appl. No. 16/151,090, dated Feb. 12, 2020.
Lee et al., "Extraction and Integration of Window in a 3D Building Model from Ground View images," IEEE Computer Society Conference on Computer Vision and Pattern Recognition, 2004, 8 pages.
Non-Final Office Action from U.S. Appl. No. 15/672,200, dated Feb. 21, 2020.
Notice of Allowance from U.S. Appl. No. 16/052,495, dated Mar. 18, 2020.
Macciola et al., U.S. Appl. No. 16/824,518, filed Mar. 19, 2020.
Notice of Allowance from U.S. Appl. No. 15/339,789, dated Apr. 7, 2020.
Notice of Allowance from U.S. Appl. No. 15/394,726, dated Apr. 16, 2020.
Notice of Allowance from U.S. Appl. No. 15/672,200, dated Apr. 17, 2020.
Advisory Action from U.S. Appl. No. 15/051,587, dated Apr. 29, 2020.
Examiner's Answer to Appeal Brief from U.S. Appl. No. 15/396,306, dated May 15, 2020.
Notice of Allowance from U.S. Appl. No. 16/194,201, dated May 19, 2020.
Notice of Allowance from U.S. Appl. No. 16/206,926, dated May 21, 2020.
Non-Final Office Action from U.S. Appl. No. 15/394,731, dated May 29, 2020.
Notice of Allowance from U.S. Appl. No. 16/151,090, dated Jun. 4, 2020.

(56) References Cited

OTHER PUBLICATIONS

Corrected Notice of Allowance from U.S. Appl. No. 16/151,090, dated Jul. 22, 2020.
Ma et al., U.S. Appl. No. 16/997,800, filed Aug. 19, 2020.
Non-Final Office Action from U.S. Appl. No. 16/206,912, dated Aug. 18, 2020.
Non-Final Office Action from U.S. Appl. No. 16/824,518, dated Sep. 3, 2020.
Corrected Notice of Allowance from U.S. Appl. No. 16/151,090, dated Aug. 28, 2020.
Corrected Notice of Allowance from U.S. Appl. No. 16/194,201, dated Aug. 28, 2020.
Ma et al., U.S. Appl. No. 17/005,147, filed Aug. 27, 2020.
Ma et al., U.S. Appl. No. 17/005,171, filed Aug. 27, 2020.
Notice of Allowance from U.S. Appl. No. 16/206,926, dated Sep. 8, 2020.
Ma et al., U.S. Appl. No. 17/006,636, filed Aug. 28, 2020.
Ma et al., U.S. Appl. No. 17/006,650, filed Aug. 28, 2020.
Non-Final Office Action from U.S. Appl. No. 16/569,247, dated Oct. 29, 2020.
Notice of Allowance from U.S. Appl. No. 16/206,912, dated Nov. 16, 2020.
Final Office Action from U.S. Appl. No. 15/394,731, dated Dec. 21, 2020.
Examination Report from European Application No. 20194730.6, dated Dec. 11, 2020.
Final Office Action from U.S. Appl. No. 16/824,518, dated Feb. 23, 2021.
Notice of Allowance from U.S. Appl. No. 16/206,912, dated Mar. 8, 2021.
Supplemental Notice of Allowance from U.S. Appl. No. 16/206,912, dated Mar. 17, 2021.
Non-Final Office Action from U.S. Appl. No. 16/569,247, dated May 12, 2021.

* cited by examiner 06-27-2013 ~532

100
ITERATIVE RECOGNITION-GUIDED THRESHOLDING AND DATA EXTRACTION

FIELD OF INVENTION

The present invention relates to image capture and image processing. In particular, the present invention relates to capturing and processing digital images using a mobile device, and extracting data from the processed digital image using a recognition-guided thresholding and extraction process.

RELATED APPLICATIONS

This application is related to U.S. Provisional Patent Application No. 62/194,783, filed Jul. 20, 2015; U.S. Pat. No. 9,058,515, filed Mar. 19, 2014; U.S. Pat. No. 8,885,229, filed May 2, 2014; U.S. Pat. No. 8,855,375, filed Jan. 11, 2013; U.S. Pat. No. 8,345,981, filed Feb. 10, 2009; U.S. Pat. No. 9,355,312, filed Mar. 13, 2013; and U.S. Pat. No. 9,311,531, filed Mar. 13, 2014; each of which is herein incorporated by reference in its entirety.

BACKGROUND OF THE INVENTION

Digital images having depicted therein an object inclusive of documents such as a letter, a check, a bill, an invoice, etc. have conventionally been captured and processed using a scanner or multifunction peripheral (MFP) coupled to a computer workstation such as a laptop or desktop computer. Methods and systems capable of performing such capture and processing are well known in the art and well adapted to the tasks for which they are employed.

More recently, the conventional scanner-based and MFP-based image capture and processing applications have shifted toward mobile platforms, e.g. as described in the related patent applications noted above with respect to capturing and processing images using mobile devices (U.S. Pat. No. 8,855,375), classifying objects depicted in images captured using mobile devices (U.S. Pat. No. 9,355,312, e.g. at column 9, line 9-column 15, line 28), and extracting data from images captured using mobile devices (U.S. Pat. No. 9,311,531, e.g. at column 18, line 25-column 27, line 16).

While these capture, processing, classification and extraction engines and methods are capable of reliably extracting information from certain objects or images, it is not possible to dynamically extract information from other objects, particularly objects characterized by a relatively complex background, and/or overlapping regions of foreground (e.g. text) and background. In practice, while it may be possible to reliably extract information from a simple document having a plain white background with dark foreground text and/or images imposed thereon, a document depicting one or more graphics (such as pictures, logos, etc.) as the background with foreground text and/or images imposed thereon, especially if overlapping.

This problem arises primarily because it becomes significantly difficult to distinguish the foreground from the background, especially in view of the fact that digital images are conventionally converted to bitonal (black/white) or grayscale color depth prior to attempting extraction. As a result, tonal differences between background and foreground are suppressed in converting the color channel information into grayscale intensity information or bitonal information.

This is an undesirable limitation that restricts users from using powerful extraction technology on an increasingly diverse array of documents encountered in the modern world and which are useful or necessary to complete various mobile device-mediated transactions or business processes.

For example, it is common for financial documents such as checks, credit cards, etc. to include graphics, photographs, or other imagery and/or color schemes as background upon which important financial information are displayed. The font and color of the foreground financial information may also vary from "standard" business fonts and/or colors, creating additional likelihood that discriminating between the foreground and background will be difficult or impossible.

Similarly, identifying documents such as driver's licenses, passports, employee identification, etc. frequently depict watermarks, holograms, logos, seals, pictures, etc. over which important identifying information may be superimposed in the foreground. To the extent these background and foreground elements overlap, difficulties are introduced into the discrimination process, frustrating or defeating the ability to extract those important information.

Therefore, it would be highly beneficial to provide new method, system and/or computer program product technology for extracting information from complex digital image data depicting highly similar foreground and background elements, and/or overlapping background and foreground elements.

SUMMARY

According to one embodiment, a computer-implemented method includes: identifying a region of interest within a digital image; generating a plurality of binarized images based on the region of interest, wherein some or all of the binarized images are generated using a different one of a plurality of binarization thresholds; and subjecting the region of interest within a digital image to a plurality of thresholding and extraction iterations; extracting data from some or all of the plurality of binarized images; wherein the extracted data comprises one or more connected components represented in the plurality of binarized images; and wherein one or more of the connected components overlap or are obscured by one or more unique background elements such that no single binarization threshold applied to a region encompassing the one or more connected components can identify the one or more of the connected components that overlap or are obscured by the one or more unique background elements.

According to another embodiment, a computer program product includes a non-transitory computer readable medium having embodied therewith computer readable program instructions configured to cause a processor, upon execution thereof, to: identify, using the processor, a region of interest within a digital image; generate, using the processor, a plurality of binarized images based on the region of interest, wherein some or all of the binarized images are generated using a different one of a plurality of binarization thresholds; and extract, using the processor, data from some or all of the plurality of binarized images. Extracting the data from some or all of the plurality of binarized images comprises: generating, using the processor, at least one sequence of candidate extraction results for each grouping of one or more connected components depicted within the region of interest; determining, using the processor, an optimal extraction result within each sequence of candidate extraction results; and assembling, using the processor, all of the optimal extraction results into a single string of the one or more connected components. Determining the optimal extraction result within each sequence of candidate extraction results comprises selecting, using the processor, one extraction result within each sequence of candidate extraction results so as to minimize intensity differences between the optimal extraction results assembled into the single string. At least some of the connected components are text characters.

According to yet another embodiment, a system includes: a processor; and logic integrated with and/or executable by the processor to cause the processor to: identify a region of interest within a digital image; generate a plurality of binarized images based on the region of interest, wherein some or all of the binarized images are generated using a different one of a plurality of binarization thresholds; and extract data from some or all of the plurality of binarized images. Extracting the data from some or all of the plurality of binarized images comprises: generating at least one sequence of candidate extraction results for each grouping of one or more connected components depicted within the region of interest; determining an optimal extraction result within each sequence of candidate extraction results; and assembling all of the optimal extraction results into a single string of the one or more connected components. Determining the optimal extraction result within each sequence of candidate extraction results comprises selecting one extraction result within each sequence of candidate extraction results so as to minimize intensity differences between the optimal extraction results assembled into the single string. At least some of the connected components are text characters.

Other aspects and embodiments of the present invention will become apparent from the following detailed description, which, when taken in conjunction with the drawings, illustrate by way of example the principles of the invention.

DETAILED DESCRIPTION

Figure 1:
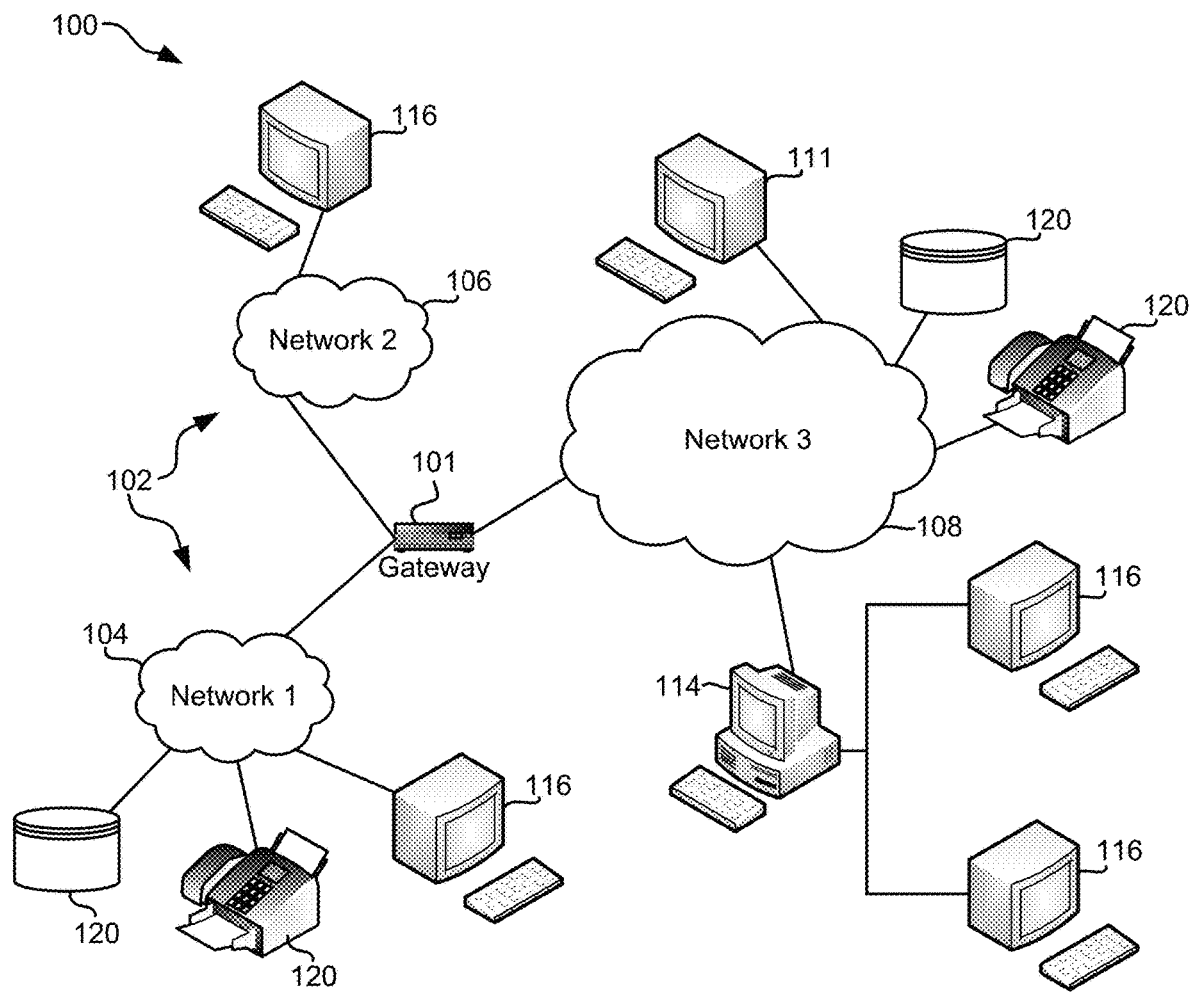
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. In particular, the presently disclosed inventive concepts concern determining optimum binarization parameters for recognizing and/or extracting features of an image, especially text. Determining optimum binarization parameters involves an iterative process whereby various binarization thresholds are employed to an image, and data are extracted from the binarized images to determine whether and to what degree the extraction result matches an expected result.

According to one embodiment, a computer-implemented method includes: identifying a region of interest within a digital image; generating a plurality of binarized images based on the region of interest, wherein some or all of the binarized images are generated using a different one of a plurality of binarization thresholds; and extracting data from some or all of the plurality of binarized images.

In accordance with another embodiment, a system such as a mobile device includes a processor and logic integrated with and/or executable by the processor. The logic is configured, upon execution thereof, to cause the processor to: identify a region of interest within a digital image; generate a plurality of binarized images based on the region of interest, wherein some or all of the binarized images are generated using a different one of a plurality of binarization thresholds; and extract data from some or all of the plurality of binarized images.

According to yet another embodiment, a computer program product includes a computer readable medium having embodied therewith computer readable program instructions configured to cause a processor, upon execution of the instructions, to: identify, using the processor, a region of interest within a digital image; generate, using the processor, a plurality of binarized images based on the region of interest, wherein some or all of the binarized images are generated using a different one of a plurality of binarization thresholds; and extract, using the processor, data from some or all of the plurality of binarized images.

As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
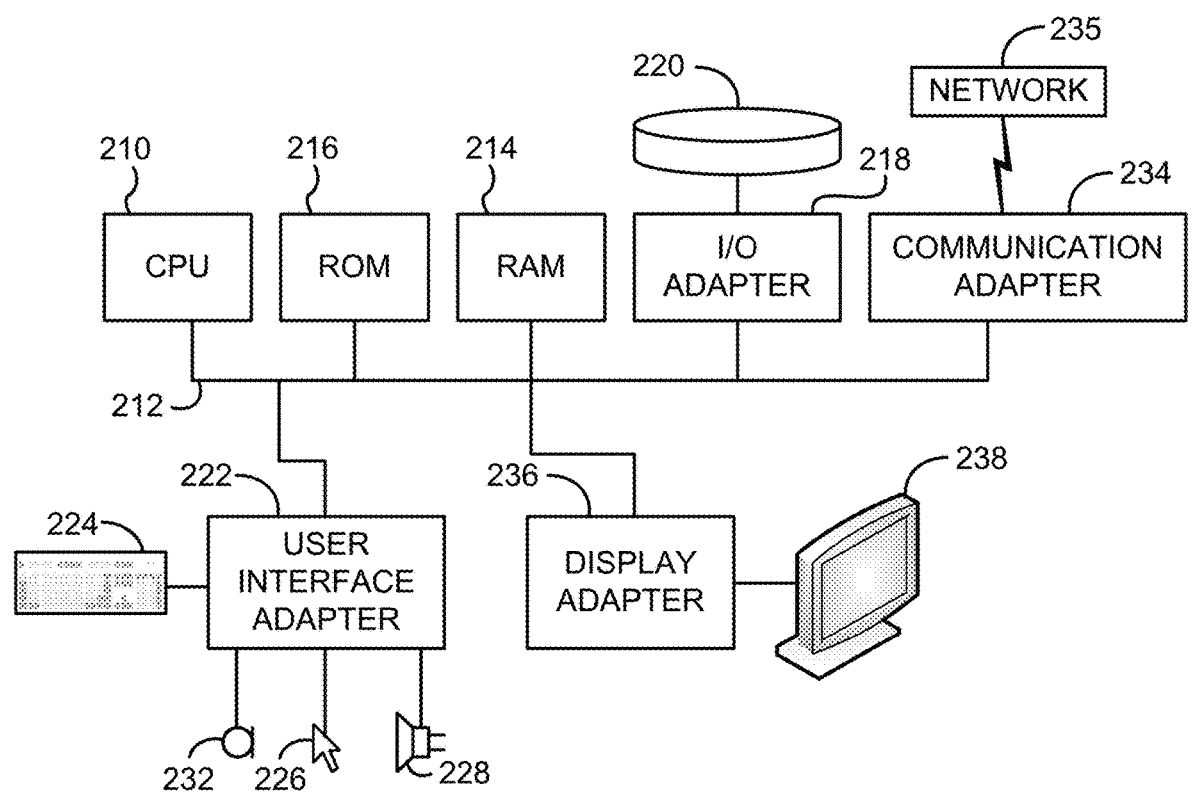
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. Patents, Patent Publications, and/or Patent Applications incorporated herein by reference. For example, digital images suitable for processing according to the presently disclosed algorithms may be subjected to image processing operations, such as page detection, rectangularization, detection of uneven illumination, illumination normalization, resolution estimation, blur detection, classification, data extraction, etc.

In more approaches, the presently disclosed methods, systems, and/or computer program products may be utilized with, implemented in, and/or include one or more user interfaces configured to facilitate performing any functionality disclosed herein and/or in the aforementioned related patent applications, publications, and/or patents, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent applications, publications, and/or patents, among others that would be appreciated by one having ordinary skill in the art upon reading these descriptions.

It will further be appreciated that embodiments presented herein may be provided in the form of a service deployed on behalf of a customer to offer service on demand Intelligent, Iterative Recognition-Guided Thresholding In general, the presently disclosed inventive concepts encompass the notion of performing a recognition-guided thresholding and extraction process on individual regions of interest of a digital image to maximize the quality of the processed (preferentially a binarized image, since a great number of OCR engines rely on binary images as input) for subsequent extraction of information therefrom. The process is iterative in that individual regions of interest are identified, and subjected to a plurality of thresholding and extraction iterations, in an attempt to identify the best quality image for extraction. The process is intelligent in that a training phase is employed from which a priori expectations may be developed regarding the nature (e.g. identity, location, size, shape, color, etc.) of information depicted in images of objects belonging to a common classification, e.g. driver's licenses issued by a particular state. These a priori expectations may be leveraged in subsequent operations directed to extracting information from other objects belonging to the same classification, for example by matching an expected region of interest identity with an expected region of interest location, it is possible to acquire confidence in the extraction result. For instance, and as will be described in further detail below, by matching a region of interest location with an expected region of interest identity, the result of extraction from various image "frames" subjected to different threshold levels may be evaluated to determine whether the extraction at one particular threshold is "correct."

In the training phase, image features (such as the bounding box locations and OCR results from various regions of interest) are determined for a plurality of images depicting representative exemplars of a class of object, such as a document or person. The features are determined using a learn-by-example classification technique. Features are analyzed to determine characteristic features of the subject of the image. For example, characteristic features include any suitable feature upon which a person or item may be identified, such as the dynamic location range for the region (i.e. a subset of pixels within the image in which a field or object is statistically likely to be located, which may preferably be determined based on observing location of many exemplars in the training phase); median height, width, or other dimension(s) of each region; appropriate character set for each region; text or image formatting for each region; text color for each region; background color for each region; text alignment for each region; etc. as would be understood by a person having ordinary skill in the art upon reading the present descriptions.

A set of characteristic features is preferably defined as corresponding to objects belonging to a particular class of object based on this training. In this manner, it is possible to subsequently facilitate identification of characteristic features based on object class, and vice-versa, in various embodiments. For example, an image may be labeled as depicting a particular class of object, and features of the individual object belonging to that particular class may be determined based in whole or in part on the class definition including the characteristic object features. Conversely, an object may be determined to belong to the particular class based on determining an image of the object depicts some or all of the characteristic features defined in the class definition.

A trained system, algorithm, technique, etc. as referenced above is provided a test or sample image, e.g. an image depicting a document belonging to a particular class of objects for which the system, algorithm, technique, etc. was trained. Using the test image, the presently disclosed inventive concepts perform an initial classification and extraction operation such as described in U.S. Pat. No. 9,355,312; and/or U.S. Pat. No. 9,311,531 and attempt to extract as much information as possible from the image based on the object class and corresponding extraction model.

However, for various reasons including background/foreground overlap, complex background, etc., at least some of the information cannot be reliably extracted. For example, in one embodiment an image depicts a driver's license wherein the name, date of birth, expiration date, etc. partially overlap with a state seal depicted in the background of the driver's license and a hologram overlaying the text (e.g. embedded in a laminate layer overlaying the foreground text and the background state seal). Worse still, the name, date of birth, expiration date, etc. is depicted in a font color substantially similar to the color of the state seal, but significantly contrasting with other portions of the driver's license background.

In preferred embodiments, training therefore may also encompass the initial attempt to extract information, such that particular elements within the image which are robustly difficult or impossible to accurately extract may be identified. This "trouble region" information may be included as part of the characteristic features of the object, such that computational cost of performing iterative, recognition-guided thresholding as described further below is minimized.

As will be appreciated by skilled artisans, it is incredibly difficult if not impossible to define appropriate parameters for extracting underlying information such as text from an image that depicts text or other foreground regions having both substantial similarity and substantial contrast with the background region(s) they respectively overlay/overlap. This is in part because extracting underlying information relies in some form on reducing the color depth of the received image, e.g. from RGB to grayscale or bi-tonal, before performing recognition, e.g. OCR, intelligent character recognition (ICR), etc. as would be understood by a person having ordinary skill in the art upon reading the present descriptions. As a result, where a region depicts both significantly similar and significantly contrasting foreground and background elements, it is not possible to define color suppression (e.g. binarization) parameters which generate a legible result for both the significantly similar foreground/background elements and the significantly contrasting foreground/background elements.

Instead, color suppression parameters may be configured to boost the contrast between the significantly similar foreground/background elements, but this generally renders the significantly contrasting foreground/background elements illegible. In the opposite scenario, e.g. without contrast boosting, the significantly contrasting foreground/background elements are legible, but the significantly similar foreground/background elements are not. In rare circumstances, it may be possible to achieve an intermediately contrasting result by boosting contrast only slightly, but in practice this approach does not adequately facilitate extraction of all elements within the region of interest.

In order to accomplish accurate and reliable extraction of both significantly similar and significantly contrasting foreground/background elements within a single image or region of interest of an image, the presently disclosed inventive concepts propose an iterative, intelligent, recognition-guided thresholding and extraction process. In essence, and with reference to a string of text characters as the exemplary embodiment, the thresholding process may be performed in a manner that renders a legible result on a per-character basis, and upon achieving a legible result, extraction is performed on the legible result, and the process proceeds to obtain a legible result for other characters in the string. Upon accurately extracting all individual characters, the string may be reconstructed from the aggregate extraction results, including the extracted portion(s) of the image, as well as the result of extracting the region of interest (e.g. OCR result). As described herein, this basic procedure is referred to as recognition-guided thresholding.

Of course, it should be understood that recognition-guided thresholding as generally described herein may be performed on the basis of any suitable confidence criterion, and need not evaluate textual information as a means of deriving such confidence information. For example, in various approaches image features may serve as the basis for deriving confidence.

In one implementation, a recognition-guided thresholding process may identify a region of interest depicting one or more image features. Characteristics of the image features (e.g. size, location, shape, color profile, etc.) may be known based on a training operation such as a learn-by-example classification training operation. For example, a class of documents includes an image feature comprising an embedded security mark that overlaps with or is otherwise partially obscured by background textures appearing in the document. In order to authenticate the document, it is necessary to extract and verify the security mark. So as to overcome the apparent obscurity or overlap, it may be advantageous to apply an iterative thresholding process as described herein, and evaluate confidence of a result under each threshold on the basis of image features in the thresholded region matching corresponding image features in thresholded training images.

Of course, any other equivalent means of determining confidence as to whether a particular image feature matches an expected image feature may be employed without departing from the scope of the present disclosures.

Recognition-guided thresholding and extraction may also preferably include color normalization as an aspect of improving extraction robustness and accuracy. As discussed herein, color normalization should be understood as normalizing intensity values across the various color channels (e.g. R, B and G) to "stretch" each channel onto a single normalized scale. Most preferably, color normalization is performed prior to thresholding, and may be performed for each region of interest independently or on the aggregate of all regions of interest. This is particularly advantageous where foreground and background are similar and relatively dark, and assists in discriminating between foreground and background by "stretching" the values across the entire intensity range.

For instance, an image region is characterized by pixels having a RGB color profile. No pixel in the region has an intensity value greater than 100 in any color channel. Each color channel permits intensity values in a range from 0-255. In this scenario, color normalization may effectively set the maximum intensity value of 100 as corresponding to the maximum value in the range, and "stretch" the intervening values across the entire color space, such that each difference of 1 intensity unit in the original image becomes effectively a difference of 2.55 intensity units.

Of course, it should be understood that the iterative thresholding and extraction process described above is equally applicable to extraction of non-textual information, such as lines or other document structures, graphical elements, etc., as long as there is a quality criterion (as akin to OCR confidence for characters, e.g. a classification-based or other feature-matching confidence measure) evaluating the result. For example, consider a graphical element depicting a gradient of color, which progresses from contrasting with the background to substantially representing the background color the graphical element overlays. In such circumstances, it is similarly possible to progress along the gradient (or other pattern or progression) using an iterative thresholding process to extract a legible or clear version of the graphic.

In practice, and according to another exemplary approach based on connected components, images of a particular class of object such as a document may depict a plurality of regions of interest each corresponding to one or more of photograph(s), document structure, graphical elements, text fields, etc. A plurality of such images are used in a training phase as described above, and subsequent to training an image depicting a plurality of regions of interest is analyzed.

As referred-to herein, it should be understood that the term "connected component" refers to any structure within a bitonal image that is formed from a contiguous set of adjacent black pixels. For example connected components may include lines (e.g. part of a document's structure such as field boundaries in a form), graphical elements (e.g. photographs, logos, illustrations, unique markings, etc.), text (e.g. characters, symbols, handwriting, etc.) or any other feature depicted in a bitonal image. Accordingly, in one embodiment a connected component may be defined within a bitonal image according to the location of the various pixels from which the component is formed.

The term "image feature" is to be understood as inclusive of connected components, but also includes such components as may be defined within color spaces other than a bitonal image. Thus, an image feature includes any structure of an image that is formed from a contiguous set of adjacent pixels. The image feature may be defined according to the location of constituent pixels as noted above for connected components, but may also include other information such as intensity information (e.g. in one or more color channels).

Based on the training phase, each region of interest expected to appear is known a priori, preferably both in terms of the statistically-likely location of the region, as well as an expected identity of one or more image features and/or connected components located within the region (including an expected set of possible identities, such as a subset of alphanumeric characters, pixel color channel values, feature shape, size, etc. or other identifying characteristics of one or more connected components located within the region of interest).

This information is utilized to perform conventional classification and extraction, by which a plurality of expected regions of interest are successfully extracted, while others are either not found or imperfectly extracted.

One or more particular regions of interest, e.g. depicting a field partially or wholly overlaying a seal, logo, or other similar background texture, may be known to be among the "trouble regions" defined in the classification, and/or may be determined "trouble regions" based on achieving imperfect/incomplete extraction results from the conventional approach. In response to determining a trouble region exists in the digital image, in some approaches a determination may be made that recognition-guided thresholding should be applied to the particular trouble regions, and/or optionally on all regions of interest in the digital image.

Each of the particular regions of interest are subjected to a color normalization process to stretch the intensity values in each color channel, thereby enhancing ability to distinguish between foreground and background elements.

In one exemplary approach, where the confidence measure is OCR confidence and the primary but nonexclusive objective is to threshold textual information, each particular region is matched to a corresponding region of interest known from the training set, e.g. based on its location, and is rendered (e.g. in grayscale) using channel weights derived from the analysis of foreground and background colors so that the foreground in the rendered image is made dark vs. lighter background. If the foreground is known or determined to be brighter than the background, this rendered image is inverted.

For each region of interest, a plurality of thresholds are applied to the rendered image, which is preferably a grayscale image, of the rectangular region encompassing the region of interest. Each threshold represents a different intensity value along a range of intensity values (e.g. grayscale intensity), and generates a different binary image with a number of connected components. Each component is subjected to a recognition process such as optical character recognition to attempt extracting information therefrom, e.g. character identity. As will be understood by those having ordinary skill in the art, the OCR may achieve varied results across the set of connected components. However, it is extremely likely that in at least one such binary image the component will be legible and the extraction will match expected extraction results based on the training set. For example, the extracted character may match an expected character or match one of a set of possible expected characters with high confidence, and deemed a candidate on this basis.

While the above example contemplates performing a plurality of thresholding operations on a particular region, it is also within the scope of the present disclosures to perform thresholding on a per-component or a per-feature basis. For example, in one approach a particular region may depict text having a known character spacing, or depict one or more image features according to a known pattern. It may be advantageous in some approaches to perform thresholding on individual features rather than the region as a whole. For example, the region may be divided according to the known character spacing or pattern, and each subregion defined therein may be separately subjected to thresholding, which may utilize different parameters than a thresholding process applied to the region as a whole.

In this manner, it is possible to tailor the thresholding to the individual feature or component desired for extraction, as well as for an immediately surrounding background region, without needing to consider the differences between the foreground and background of the region as a whole.

For instance, in one approach a credit card may depict a credit card number comprising a plurality of characters arranged in a line and having equal spacing between each character. The credit card number as a whole may be encompassed within a region of interest, which may be matched as described above. In addition or in the alternative to performing region-based thresholding as above, thresholding may include subdividing the region into a plurality (e.g. 16) subregions of interest, and performing thresholding on each individual region. This may be particularly useful in situations where, e.g., the credit card depicts a complex background whereby some but not all of the characters in the credit card number are in "trouble spots" and overlap or are obscured by unique background elements, such that no single threshold applied to the region as a whole can identify character(s) overlapping one or more of the unique background elements. By isolating those characters, thresholding may be specifically performed on the "trouble spot" to maximize the likelihood of achieving a candidate result with sufficient confidence for extraction.

In any event, as the threshold value diminishes the amount of black in the binary image is reduced and connected components become thinner and break into smaller components. Performing OCR on the sequence of progressively thinning components associated with diminishing threshold levels with significant overlap of their bounding boxes generates a sequence of candidates, and as the components break up a formerly single candidate with a wider bounding box may be replaced by a more confident pair or triplet of components associated with a lower threshold level. The candidates with highest confidences form the final string.

In some approaches, since the highest confidence candidates for a particular character/feature/component, etc. may include several (potentially consecutive) binarization threshold levels, it may be advantageous to choose from among the several highest confidence candidates. For instance, in situations where intensity values are minimized across multiple extraction results to assemble a contiguous extracted result, it may be useful to select one of the highest confidence candidates having an intensity value closest to a mean, median, etc. intensity of other frames to be used in assembling the final extraction result. Accordingly, in one embodiment the presently disclosed inventive concepts include techniques for determining from which thresholded image(s) to select a corresponding bounding box into the final binary rendition of the original region of interest.

Upon identifying the threshold range for each candidate in the region of interest, the various bounding boxes (and/or extraction results obtained therefrom) may be assembled into a cohesive result. As noted in further detail herein, in some embodiments where the various portions of the image corresponding to each component are to be assembled, it is advantageous to select a legible bounding box (but not necessarily the one with the highest confidence character) for some or all of the components in order to generate a more consistent visual result.

As another advantage, the presently disclosed inventive, recognition-guided thresholding process provides superior accuracy and reliability even outside the context of foreground elements that overlap with similar background elements. For instance, and as known in the art, extraction may be frustrated or rendered impossible due to poor image quality, e.g. arising from insufficient illumination in the capture environment, presence of artifacts such as shadows, etc.

To address these common problems, conventional image processing algorithms seek to improve the quality of the image as a whole, which yields moderate improvements to extraction capability, e.g. via correcting a uniformly insufficient illumination and permit improved distinction between foreground and background elements. However, these conventional solutions approach the rectification process from the perspective of the image, rather than individual elements of the image (e.g. connected components), and thus are limited in applicability and efficacy because adjustments that may be appropriate for one portion of an image are not appropriate or are less appropriate for other portions of the image.

By contrast, the presently disclosed inventive concepts can provide extraction that is robustly capable of extracting only the information from the image that most closely matches expected information based on training, both in terms of information content (e.g. text character identity) as well as location (e.g. center pixel, dynamic region, etc.). In particularly preferred approaches, extracted information matches the expected information in terms of information content, location, and size.

Figure 5:
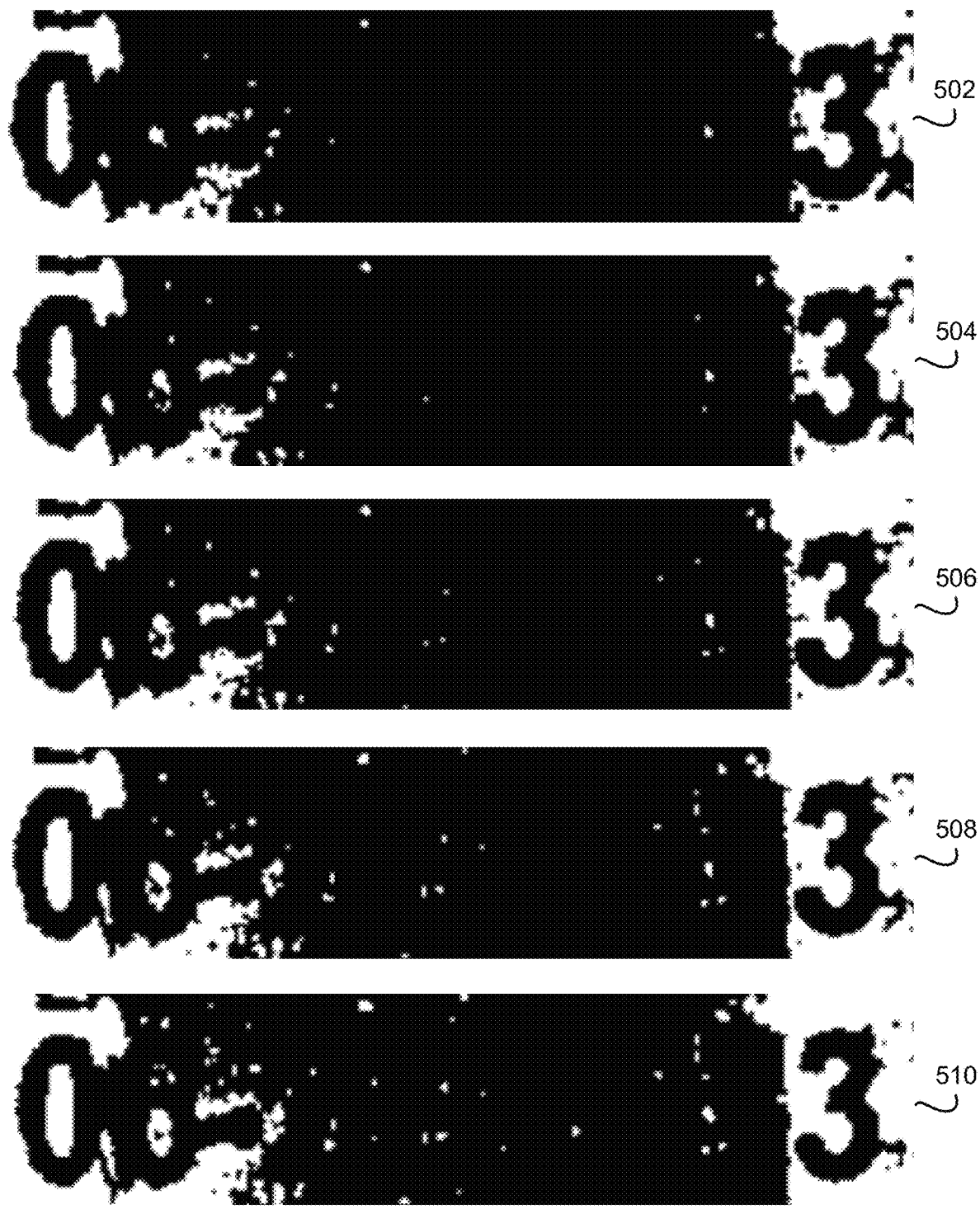
FIG. 5 depicts a plurality of binary images generated by applying a plurality of different binarization thresholds to the grayscale image shown in FIG. 4, according to one embodiment.
Figure 5:
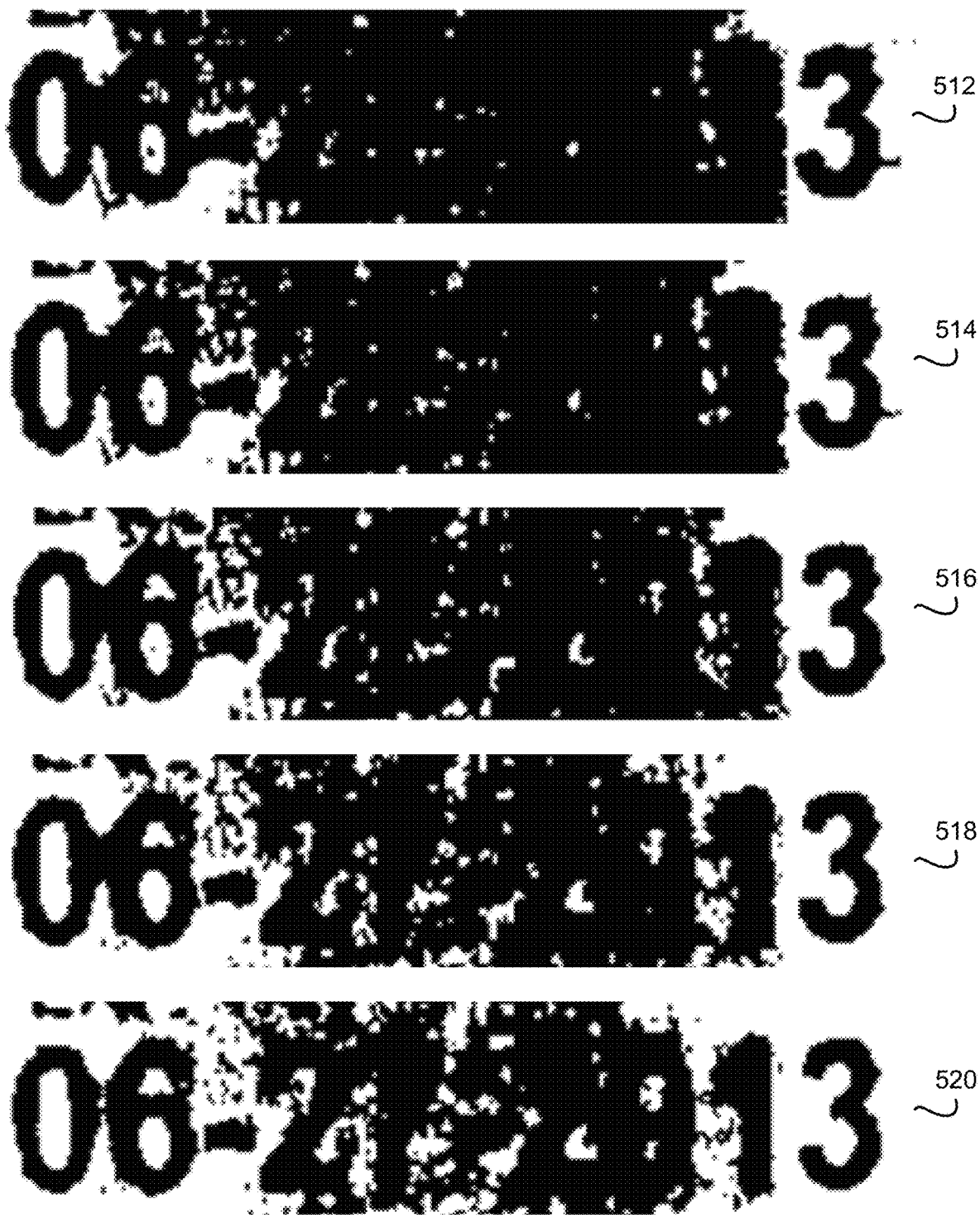
Figure 5:

For instance, and as will be appreciated by persons having ordinary skill in the art upon reading the present descriptions, insufficient contrast between foreground and background in a digital image can have the effect of making foreground elements appear larger, due to "blobifying" of the foreground element (see, e.g. images 502-520 of FIG. 5, where the "0" and "6" characters are connected as a single "blob" that is not resolved until image 522). As a result, in an image having insufficient contrast, an expected element may be identifiable, but the appearance of the element may be unreliably identifiable due to obscured boundaries between foreground and background, or the identity of the element may be in question because the element is not fully contained within the dynamic region where the element is expected based on training.

Similarly, when contrast is excessive, a single element in an image may appear "broken" into several constituent elements (e.g. connected components) which may be unrecognizable or problematically represent an incorrect element (e.g. a capital letter "H" representing two adjacent "1" or "1" characters when the cross-bar is broken or missing). By leveraging the expected identity, location, and size, the presently disclosed concepts may more accurately and robustly determine, e.g. based on the width of spacing between the two "1" or "1" characters, the location within the image, and/or the identity of the components extracted from a corresponding location in training, that the component is actually a capital H instead of adjacent "1" or "1" characters.

In addition and/or alternatively, the presently disclosed inventive concepts may include determining a more appropriate image intensity to utilize prior to extracting the "H" character based on an iterative thresholding process as described herein. Accordingly, not only may overall extraction be improved with respect to compliance with expected results, the quality of information extracted may be bolstered by selectively thresholding the region from which the component is to be extracted.

Thus, while conventional image processing techniques are limited to determining the best possible extraction based on the overall image, the presently disclosed techniques can evaluate each element or grouping of elements (such as connected components) individually at varying levels of image intensity, and thus provide a more accurate extraction result (e.g. by selecting a frame where the component most closely matches the size, shape, and location expected by training from among a plurality of frames, where each frame depicts the component at a different level of image intensity).

Accordingly, in several embodiments evaluating each element or grouping of elements may include generating a sequence of candidate extraction results for each element or grouping of elements. Preferably, each sequence of candidate extraction results includes and/or is based on extracting data from a plurality of images each generated using a different binarization threshold but depicting the same element or grouping of elements. Thus each sequence of candidate extraction results preferably represents data extracted from a plurality of images spanning a spectrum or range of binarization thresholds, and more preferably represents data extracted from a plurality of images depicting the same content, or at least the same element or grouping of elements.

While in preferred approaches each sequence of candidate extraction results includes candidates corresponding to different binarization thresholds, various individual candidate extraction results from different sequences of candidate extraction results may correspond to the same binarization threshold. The candidate extraction results from different sequences may include images and/or data extracted therefrom corresponding to some of the same elements or groupings of elements as elements or groupings of elements to which other sequences correspond. For example, in one embodiment a windowed approach may attempt to extract data from adjacent pairs, triplets, etc. of connected components within a region of interest. However, in preferred embodiments each sequence of candidate extraction results includes or is based on extracting data from images depicting at least one non-overlapping element or groupings of elements.

In addition, the overall extraction process is more robust since the evaluation can be performed individually for each component, rather than on the image as a whole, increasing the likelihood of extracting a similarly accurate result from even drastically different renditions of the same image, or from different portions of a single image (e.g. illuminated region versus shadowed region, regions having different color profiles and/or color depths, etc.).

Those having ordinary skill in the art will also appreciate that this recognition-guided thresholding and extraction technique may generate resulting extracted versions of portions of a component or element which exhibit perhaps drastically different appearance, to the point of potentially looking like a "mosaic" or "ransom note" stitched together from multiple images. For example, adjacent characters, one of which overlays a dark background but the other of which overlays only a bright background, may be extracted based on very different image intensity levels and thus appear very different upon recreating or synthesizing a composite of the extracted components.

To alleviate this artifact, it is advantageous to select from among plural exemplary frames of a component so as to minimize the overall range of frame intensity across a particular set of components. For instance, assuming a two-component element is represented by a plurality of frames for each component, each of the plurality of frames being characterized by a different intensity level. While it may be the case that the most legible frame for the first component is characterized by an intensity of 100, and the most legible frame for the second component is characterized by an intensity of 20, if each component has a frame that is legible (even if not most legible) and characterized by a value closer to the midpoint between the two values (i.e. 60), it is preferable in some approaches to choose the frames that more closely match in intensity to generate a single, consistently intense result.

In practical application, the presently disclosed inventive techniques have been applied to images depicting driver licenses. Training involved providing a plurality of exemplar driver licenses from a particular state, identifying characteristic features thereof, defining a classification based on the characteristic features, and attempting classical extraction.

Based on this training, several "trouble regions" were identified, and intelligent, iterative thresholding was applied to these regions when processing subsequent test images.

From experimentation, it was determined that iterative, intelligent thresholding as described herein employ approximately twenty thresholds with which to investigate the image to determine ideal extraction parameters and perform extraction therewith.

The various threshold levels may be evenly distributed across a particular range, e.g. grayscale intensity ranging from 0-255, or may be staggered throughout a particular range, e.g. according to predetermined intensity levels known to generate desirable extraction results. Again, according to experimental results, it is apparent that distributing the threshold levels across a grayscale intensity ranging from 1 to 120 (i.e. each threshold corresponding to a 6-point intensity increment) is advantageous for extracting text from documents or images featuring complex backgrounds and/or illumination variations, e.g. from shadows, glare, etc.

As will be appreciated by skilled artisans, different threshold values, distributions, or ranges may be appropriate depending on the nature of the image data to be processed. The aforementioned experimentally determined values were established as optimal for processing complex documents having primarily a white or light colored background, with a plurality of dark background and foreground elements depicted thereon.

Figure 3:
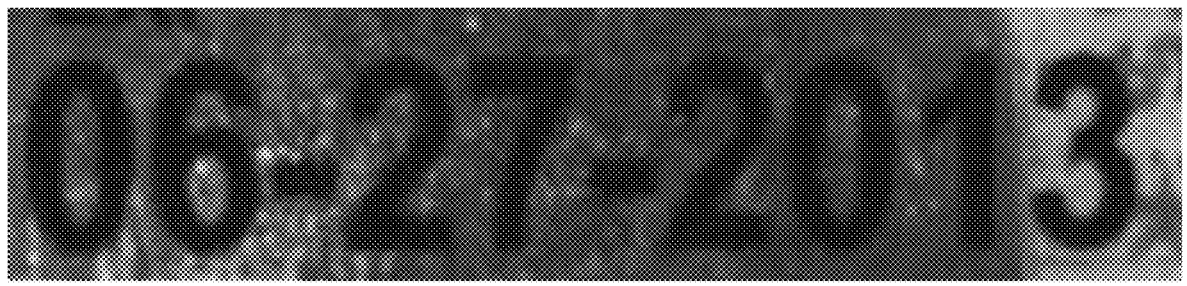
FIG. 3 a portion of a driver's license in a color rendition, according to one embodiment.
Figure 4:
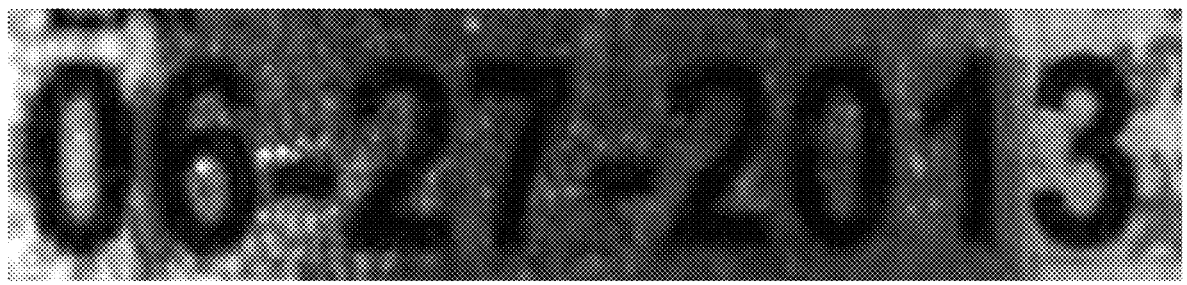
FIG. 4 depicts the same portion of the driver's license, in a grayscale rendition generated from the color image shown in FIG. 3, according to one embodiment.

The images depicted in FIGS. 3-5 represent experimental results determined from a Massachusetts driver's license when attempting to extract an expiration date that overlaps a complex background texture, in this case the state seal, forming a "trouble region" where thresholding and extraction using conventional (e.g. OCR) approaches cannot obtain the entire date. In all images depicted in FIGS. 3-5, the expiration date is Jun. 27, 2013 (represented as "06-23-2013"). The images have been enlarged to emphasize differences.

First, FIG. 3 shows a rendition of the image in color, where many different colored background textures underlay the month, date and the majority of the year. Although the electronic record of the present application will reflect FIG. 3 in grayscale, skilled artisans in the field of image processing and object recognition will appreciate, e.g. by way of comparison to FIG. 4, that the complexity of color images such as FIG. 3 is greater than that of grayscale or bitonal images.

As will be further appreciated by those having ordinary skill in the art, and as described in further detail elsewhere herein, presence of complex backgrounds is a common source of error in attempting to extract information from an image, particularly where the information to be extracted overlaps in whole or in part with the complex background.

FIG. 4 depicts the same portion of the driver's license, appearing in a grayscale rendition of the color image shown in FIG. 3. As can be seen from FIG. 4, conventional techniques for reducing color depth across an entirety of a particular image are often incapable of removing or rectifying the source of extraction error, e.g. a complex background or illumination problem/variance. As shown in FIG. 4, the complexity of the background is reduced relative to the color rendition shown in FIG. 3, but retains sufficient variation in background texture that applying a single binarization threshold to the grayscale rendition shown in FIG. 4 will not enable accurate extraction of all text depicted in the region of interest (expiration date field).

For example, according to one embodiment none of the plurality of images shown in FIG. 5, each of which were generated by applying a different binarization threshold to the image shown in FIG. 4, are suitable for extracting all characters depicted in the region of interest with sufficient confidence. Each of the plurality of images may be suitable for extracting one or more of the characters with sufficient confidence, but in each image at least one character is sufficiently degraded (e.g. by white pixels for low binarization thresholds such as the bottom 25% to 33% of the range of binarization thresholds) or obscured (e.g. by black pixels for higher binarization thresholds such as the top 50% to 25% of the range of binarization thresholds) such that the obscured/degraded character(s) cannot be extracted with sufficient confidence.

FIG. 5 depicts a plurality of binary images 502-538 generated using a plurality of different binarization thresholds as described herein. The plurality of images depicted in FIG. 5 may be understood as forming a sequence of candidate extraction results, or alternatively a plurality of images upon which a sequence of candidate extraction results is based, in several embodiments. Each image is generated using a different binarization threshold, and is characterized by a difference in the binarization threshold of 6 units with respect to vertically adjacent counterparts. Thus, in accordance with FIG. 5 the first image 502 corresponds to a threshold value of 115, while the last image 538 corresponds to a threshold value of 1 (each on a scale from 0-255), and images 504-536 correspond to threshold values between 1-115, each separated by 6 units of intensity. As will be appreciated by skilled artisans, according to the binarization applied to FIG. 4 in order to generate the binary images shown in FIG. 5, pixels from the image shown in FIG. 4 having an intensity value less than the binarization threshold used to generate the corresponding image of FIG. 5 are converted to black, while pixels having an intensity value greater than or equal to the binarization threshold are converted to white. Thus, low binarization thresholds generally produce more white pixels and high binarization thresholds generate more black pixels. Although the embodiment shown and described with reference to FIGS. 3-5 involve thresholding based on grayscale pixel intensity values, it should be understood that other embodiments may additionally and/or alternatively utilize other image characteristics or values, such as intensity values in a particular color channel or combination of color channels, hue values, etc. as would be appreciated by skilled artisans upon reading the present disclosures.

Of course, in various embodiments sequences of candidate extraction results may be generated for each connected component (e.g. each character as shown in FIGS. 3-5), for different groupings of connected components (e.g. each pair or triplet of adjacent characters, each series of characters not separated by whitespace, etc.), or for the region of interest as a whole.

Figures 6A, 6B, 7:
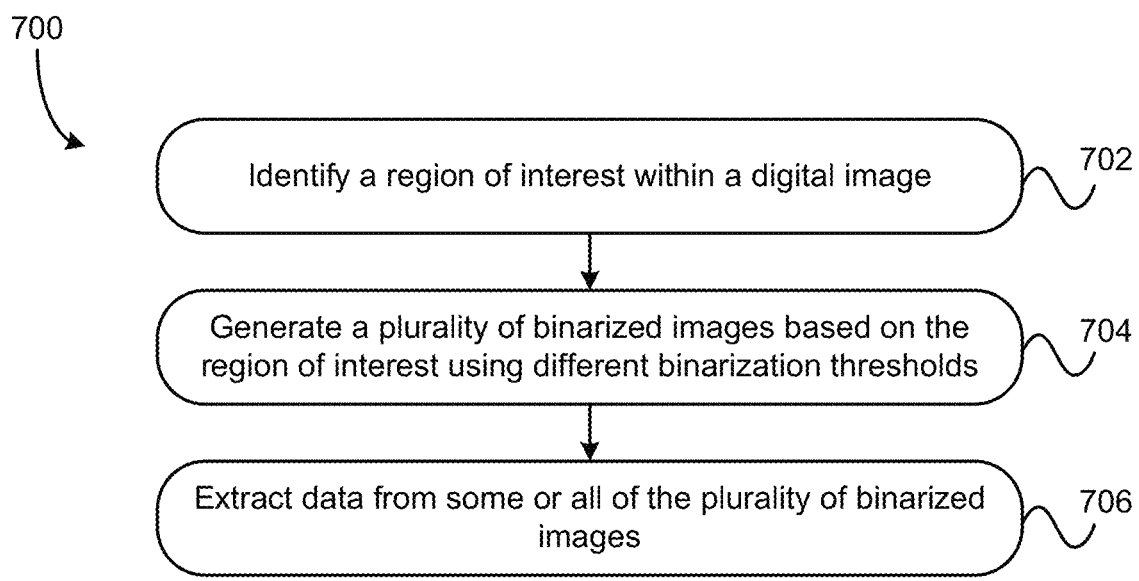
FIGS. 6A and 6B depict a composite image generated by extracting and assembling high-confidence components from the plurality of thresholded images shown in FIG. 5.
FIG. 7 is a flowchart of a method, according to one embodiment.

FIGS. 6A (enlarged) and 6B (native size) depict a composite image generated by extracting data from high-confidence candidates (e.g. candidate extraction results having confidence above a predetermined threshold) from the plurality of thresholded images shown in FIG. 5, and assembling the extracted high-confidence candidates into a single image. For instance, in one approach the composite image corresponding to FIGS. 6A and 6B may be generated by assembling an extraction result from images 522 and/or 524 for the "0" character of the month field, from images 526 and/or 528 for the "6" character of the month field, from image 530 for the hyphen separating the month and day fields as well as for the numerals forming the day and year fields, and from image 536 for the hyphen separating the day and year fields. In another embodiment extraction may be performed on the region as a whole based on image 530. Of course, in various approaches any combination of images and/or extraction results may be used to generate the composite image shown in FIGS. 6A and 6B.

In certain embodiments, it may be advantageous to essentially invert the assumptions, operation of thresholds (e.g. pixels with intensity greater than the binarization threshold convert to black, and pixels with intensity less than or equal to the binarization threshold convert to white), and/or the image data, e.g. when attempting to detect a light foreground element on a light background as opposed to a dark foreground element depicted on a dark background. This inversion may be particularly advantageous when one particular component overlays multiple different background textures, or when a particular component depicts multiple colors or textures itself.

The presently disclosed inventive concepts also encompass performing binarization (which in various embodiments involves a thresholding process, but which does not necessarily employ the iterative, Recognition-guided approach set forth herein) based on classification, e.g. as described in related U.S. Pat. No. 9,355,312. For instance, determining particular binarization parameters based on a classification of an object such as a connected component or group of connected components may include techniques and features as described in column 16, line 33-column 18, line 6 of U.S. Pat. No. 9,355,312.

Validation

In additional embodiments, classification and/or extraction results may be presented to a user for validation, e.g. for confirmation, negation, modification of the assigned class, etc. For example, upon classifying an object using semi- or fully-automated processes in conjunction with distinguishing criteria such as defined herein, the classification and the digital image to which the classification relates may be displayed to a user (e.g. on a mobile device display) so that the user may confirm or negate the classification. Upon negating the classification, a user may manually define the "proper" classification of the object depicted in the digital image. This user input may be utilized to provide ongoing "training" to the classifier(s), in preferred approaches. Of course, user input may be provided in relation to any number of operations described herein without departing from the scope of the instant disclosures.

In even more preferred embodiments, the aforementioned validation may be performed without requiring user input. For instance, it is possible to mitigate the need for a user to review and/or to correct extraction results by performing automatic validation of extraction results. In general, this technique involves referencing an external system or database in order to confirm whether the extracted values are known to be correct. For example, if name and address are extracted, in some instances it is possible to validate that the individual in question in fact resides at the given address.

This validation principle extends to classification, in even more embodiments. For example, if the extraction is correct, in some approaches it is appropriate to infer that the classification is also correct. This inference relies on the assumption that the only manner in which to achieve the "correct" extraction result (e.g. a value matches an expected value in a reference data source, matches an expected format for the value in question, is associated with an expected symbol or other value, etc. as would be understood by one having ordinary skill in the art upon reading the present descriptions).

Now referring to FIG. 7, a flowchart of a method 700 is shown according to one embodiment. The method 700 may be performed in accordance with the present invention in any of the environments depicted in FIGS. 1-2, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor of a mobile device, a processor of a workstation or server environment, some other device having one or more processors therein, or any combination thereof.

The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a region of interest within a digital image is identified. The region of interest preferably includes content such as text, a photograph, a symbol, etc. upon which extraction is to be performed, each of which may generally be represented via one or more connected components in the digital image (and/or representations of the digital image such as a grayscale or bitonal rendition of the digital image). Regions of interest may be identified in various embodiments based on a priori expectations such as a learned location of a particular field, photograph, symbol, etc. within a document, and/or image characteristics representing e.g. the identity, color, shape, size, etc. of object(s) depicted in particular location(s) of the document. As described above, in preferred approaches such a priori expectations may be developed in a training phase.

Method 700 also includes operation 704, in which a plurality of binarized images are generated based on the region of interest. The plurality of binarized images are preferably generated using a plurality of different binarization thresholds, though some of the binarized images may be generated using the same threshold(s) in some approaches. In various embodiments the plurality of binarized images may be arranged in one or more sequences, each sequence corresponding to a unique single connected component or a unique grouping of connected components from the region of interest. Where sequence(s) of binarized images are employed, preferably each image within each sequence is generated using a different binarization threshold, but images from different sequences may be generated using the same binarization threshold, in some embodiments.

With continuing reference to FIG. 7, method 700 also includes extracting data from some or all of the plurality of binarized images in operation 706. Data extraction may include any suitable form of extraction as disclosed herein and/or in the related patent documents referenced herein, in various embodiments. In preferred approaches, extraction includes recognizing text and/or objects within some or all of the plurality of binarized images, e.g. using techniques such as optical character recognition or equivalents thereof, and/or image classification and/or data extraction.

In multiple varying but combinable embodiments, method 700 may include any number of additional and/or alternative features, operations, etc. as described herein, and should be viewed as a generic embodiment of iterative, recognition-guided thresholding as contemplated by the inventors. Various species falling within the generic embodiment are described in accordance with embodiments of the invention that may be utilized in different scenarios to achieve desired binarization results. Accordingly, skilled artisans reading the present disclosure will appreciate that the embodiments described herein may be combined in any suitable manner without departing from the scope of these inventive concepts.

For instance, and in accordance with several such exemplary species embodiments, method 700 may include any one or more of the following features, functions, operations, inputs, etc.

As mentioned briefly above, in one embodiment the region of interest encompasses a plurality of connected components; and each of the plurality of binarized images corresponds to a different combination of: one of the plurality of connected components; and one of the plurality of binarization thresholds. As such, each binarized image may represent a unique combination of connected components rendered according to a unique binarization threshold with respect to that particular combination of connected components. In more embodiments, of course, there may be overlap between the combinations of connected components (e.g. a windowed approach) and/or binarization thresholds applied thereto.

With continuing reference to connected components encompassed within the region(s) of interest, in several embodiments extracting the data is performed on a per-component basis for at least some of the plurality of connected components. As such, extraction may be performed on a per-component resolution to address extreme variations in image characteristics across a particular region of interest, enabling robust extraction even when desired information overlaps with complex background texture(s) and/or variations in illumination.

In various embodiments, extracting the data generally includes estimating an identity of some or all of the plurality of connected components within one or more of the plurality of binarized images. The identity estimation may be based on a recognition engine, classification technique, etc. as discussed above, in preferred approaches. In particularly preferred approaches, estimating the identity of the connected components determining a confidence of the estimated identity of some or all of the plurality of connected components. Confidence may be determined in any suitable manner and measured according to any suitable standard, such as OCR confidence, classification confidence, etc. in various approaches.

In a preferred embodiment, determining the confidence of the estimated identity of connected components includes comparing the estimated identity of various connected components with an expected identity of the respective connected components. Such expectation-based identity comparisons may be based on a priori information derived from training, and/or based on extraction results obtained from other of the plurality of binarized images.

In some approaches, expectation-based confidence may be determined based on whether a particular component matches an expected component type and/or location, and/or whether the particular component matches one of a plurality of possible expected component types and/or locations. Accordingly, determining the confidence of the estimated identity of some or all of the connected components may include comparing the estimated location of each respective one of the plurality of connected components for which the identity was estimated with an expected location of the respective one of the plurality of connected components.

In circumstances where some or all of the plurality of connected components comprise non-textual information; determining the confidence of the estimated identity of some or all of the plurality of connected components may include classifying some or all of the connected components for which the identity was estimated. The classification is preferably based on image features such as component color, size, location, shape, aspect ratio, etc.

Where confidence measures are available, extracting data may include choosing from among a plurality of candidate component identities (e.g. "3" versus "8"), in which case the choice may be made based in whole or in part on determining whether the confidence of the estimated identity of one of the plurality of connected components is less than a predetermined confidence threshold. In cases where the confidence of the estimated identity is less than the predetermined confidence threshold, the candidate component identity may be discarded, and/or an alternate candidate component identity (preferably having a higher confidence measure, even if below the confidence threshold) may be chosen as the component identity.

In more embodiments, where the confidence of the estimated identity is less than the predetermined confidence threshold method 700 may include estimating the identity of the corresponding connected component(s) based on a different binarized image, optionally but preferably a different member of a sequence of binarized images corresponding to the same connected component(s) but generated using a different binarization threshold.

In still more embodiments of method 700, extracting data from binarized images may therefore include: generating at least one sequence of candidate extraction results for each grouping of one or more connected components depicted within the region of interest; determining an optimal extraction result within each sequence of candidate extraction results; and assembling all of the optimal extraction results into a single string of the one or more connected components.

Preferably, each sequence of candidate extraction results includes a plurality of candidate extraction results, and each candidate extraction result within a given sequence corresponds to a same connected component or grouping of connected components depicted within the region of interest. Furthermore, each candidate extraction result within the given sequence preferably corresponds to a different one of the plurality of binarization thresholds. Accordingly, each sequence may represent a spectrum of binarization results generated using different binarization thresholds to render the same connected component(s) into a binarized form.

Of course, in various embodiments candidate extraction results in different sequences may correspond to the same binarization threshold, and in one embodiment at least one candidate result from each of at least two of the sequences corresponds to a same binarization threshold.

Determining the optimal extraction result within each sequence of candidate extraction results, as mentioned above, may include selecting one extraction result within each sequence of candidate extraction results so as to minimize intensity differences between the optimal extraction results assembled into the single string. This approach facilitates avoiding the appearance of a "ransom note" in the assembled result, and may include selecting candidates that do not correspond to the highest identity confidence level in order to minimize intensity differences across the assembled result.

In one embodiment, at least two of the plurality of connected components encompassed by the region of interest are preferably extracted from different ones of the plurality of binarized images. As noted above performing extraction on a per-component basis may enable extraction of components that could otherwise not be accomplished using conventional binarization techniques.

The method 700 in one embodiment also includes normalizing color within the digital image and/or the region of interest specifically. Advantageously, region-based color normalization allows more precise extraction of data since the normalization process is not influenced by other portions of the document/digital image that may have very different color profiles and thus would "stretch" the color channels in a manner not appropriate (or less appropriate) for the particular region of interest.

As described in further detail above, method 700 may also include validating extracted data. Preferably, in such embodiments validation includes inferring a classification of an object depicted in the digital image based on validating the extracted data. For example, upon validating a name and address correspond to a same individual, a digital image or object depicted therein may be classified as an appropriate type of document, e.g. a utility bill, identification document, etc. optionally based in part on a location within the digital image/document from which the name and address are extracted. Of course, in various embodiments other combinations of criteria may be used to validate extracted information and infer therefrom a classification of a particular object.

While the present descriptions of data extraction within the scope of the instant disclosure have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may include a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
identifying a region of interest within a digital image;
subjecting the region of interest within the digital image to a plurality of thresholding and extraction iterations to generate a plurality of binarized images, wherein some or all of the binarized images are generated using different binarization thresholds selected from a plurality of binarization thresholds;
extracting data from some or all of the plurality of binarized images;
wherein the extracted data comprises one or more connected components represented in the plurality of binarized images;
wherein one or more of the connected components overlap or are obscured by one or more unique background elements such that no single binarization threshold applied to a region encompassing the one or more connected components can identify the one or more of the connected components that overlap or are obscured by the one or more unique background elements;
wherein extracting the data comprises estimating an identity of some or all of the one or more connected components within one or more of the plurality of binarized images;
wherein the estimated identity of some or all of the one or more connected components comprises a character identity, a location of the connected component, a size of the connected component, a shape of the connected component, and/or a color of the connected component; and
the method further comprising determining a confidence of the estimated identity of some or all of the one or more connected components, wherein determining the confidence of the estimated identity of some or all of the one or more connected components comprises:
comparing the estimated identity of each respective one of the one or more connected components for which the identity was estimated with an expected identity of the respective one of the one or more connected components;
comparing an estimated location of each respective one of the one or more connected components for which the identity was estimated with an expected location of the respective one of the one or more connected components; and/or
classifying some or all of the connected components for which the identity was estimated based on image features.

2. The computer-implemented method as recited in claim 1, wherein the region of interest depicts a driver license, and wherein the data are extracted from the driver license.

3. The computer-implemented method as recited in claim 1, wherein the region of interest depicts a credit card, and wherein the data are extracted from the credit card.

4. The computer-implemented method as recited in claim 1, wherein the digital image is characterized by an insufficient contrast causing boundaries between foreground and background elements of the digital image to be obscured.

5. The computer-implemented method as recited in claim 1, wherein the digital image is characterized by an excessive contrast causing single elements of the digital image to be broken into constituent elements.

6. The computer-implemented method as recited in claim 1, wherein extracting the data is performed on a per-component basis for at least some of the one or more connected components.

7. The computer-implemented method as recited in claim 1, comprising:
validating the extracted data; and
inferring a classification of an object depicted in the digital image based on validating the extracted data.

8. A computer program product, comprising a non-transitory computer readable medium having embodied therewith computer readable program instructions configured to cause a processor, upon execution thereof, to:
identify, using the processor, a region of interest within a digital image;
subject the region of interest within the digital image to a plurality of thresholding and extraction iterations to generate a plurality of binarized images, wherein some or all of the binarized images are generated using different binarization thresholds selected from a plurality of binarization thresholds; and
extract, using the processor, data from some or all of the plurality of binarized images;
wherein extracting the data from some or all of the plurality of binarized images comprises:
generating, using the processor, at least one sequence of candidate extraction results for each grouping of one or more connected components depicted within the region of interest;

determining, using the processor, an optimal extraction result within each sequence of candidate extraction results; and assembling, using the processor, all of the optimal extraction results into a single string of the one or more connected components; and wherein determining the optimal extraction result within each sequence of candidate extraction results comprises selecting, using the processor, one extraction result within each sequence of candidate extraction results so as to minimize intensity differences between the optimal extraction results assembled into the single string;

wherein at least some of the connected components are text characters;

wherein extracting the data comprises estimating an identity of some or all of the one or more connected components within one or more of the plurality of binarized images;

wherein the estimated identity of some or all of the one or more connected components comprises a character identity, a location of the connected component, a size of the connected component, a shape of the connected component, and/or a color of the connected component; and wherein the program instructions are further configured to cause the processor, upon execution thereof, to determine a confidence of the estimated identity of some or all of the one or more connected components, wherein determining the confidence of the estimated identity of some or all of the one or more connected components comprises:

comparing the estimated identity of each respective one of the one or more connected components for which the identity was estimated with an expected identity of the respective one of the one or more connected components;

comparing an estimated location of each respective one of the one or more connected components for which the identity was estimated with an expected location of the respective one of the one or more connected components; and/or classifying some or all of the one or more connected components for which the identity was estimated based on image features.

9. The computer program product as recited in claim 8, wherein the region of interest depicts a driver license, and wherein the data are extracted from the driver license.

10. The computer program product as recited in claim 8, wherein the region of interest depicts a credit card, and wherein the data are extracted from the credit card.

11. The computer program product as recited in claim 8, wherein the digital image is characterized by an insufficient contrast causing boundaries between foreground and background elements of the digital image to be obscured.

12. The computer program product as recited in claim 8, wherein the digital image is characterized by an excessive contrast causing single elements of the digital image to be broken into constituent elements.

13. The computer program product as recited in claim 8, wherein extracting the data is performed on a per-component basis for at least some of the one or more connected components.

14. The computer program product as recited in claim 8, comprising: validating the extracted data; and inferring a classification of an object depicted in the digital image based on validating the extracted data.

15. The computer program product as recited in claim 8, wherein each sequence of candidate extraction results comprises a plurality of candidate extraction results each corresponding to the same grouping of one or more of the connected components depicted within the region of interest; and wherein each of the plurality of candidate extraction results in each respective sequence of candidate extraction results corresponds to a different one of the plurality of binarization thresholds.

16. A system, comprising: a processor; and logic integrated with and/or executable by the processor to cause the processor to:

identify a region of interest within a digital image;

subject the region of interest within the digital image to a plurality of thresholding and extraction iterations to generate a plurality of binarized images, wherein some or all of the binarized images are generated using different binarization thresholds selected from a plurality of binarization thresholds;

extract data from some or all of the plurality of binarized images;

wherein extracting the data from some or all of the plurality of binarized images comprises:

generating at least one sequence of candidate extraction results for each grouping of one or more connected components depicted within the region of interest;

determining an optimal extraction result within each sequence of candidate extraction results; and assembling all of the optimal extraction results into a single string of the one or more connected components; and wherein determining the optimal extraction result within each sequence of candidate extraction results comprises selecting one extraction result within each sequence of candidate extraction results so as to minimize intensity differences between the optimal extraction results assembled into the single string;

wherein at least some of the connected components are text characters;

wherein extracting the data comprises estimating an identity of some or all of the one or more connected components within one or more of the plurality of binarized images;

wherein the estimated identity of some or all of the one or more connected components comprises a character identity, a location of the connected component, a size of the connected component, a shape of the connected component, and/or a color of the connected component; and wherein the logic is further integrated with and/or executable by the processor to cause the processor to determine a confidence of the estimated identity of some or all of the one or more connected components, wherein determining the confidence of the estimated identity of some or all of the one or more connected components comprises:

comparing the estimated identity of each respective one of the one or more connected components for which the identity was estimated with an expected identity of the respective one of the one or more connected components;

comparing an estimated location of each respective one of the one or more connected components for which the identity was estimated with an expected location of the respective one of the one or more connected components; and/or classifying some or all of the one or more connected components for which the identity was estimated based on image features.

* * * * *